Nov. 20, 1934.   F. MAMIYA   1,981,274
VEHICLE SIGNAL INDICATOR
Filed March 23, 1932   2 Sheets-Sheet 1
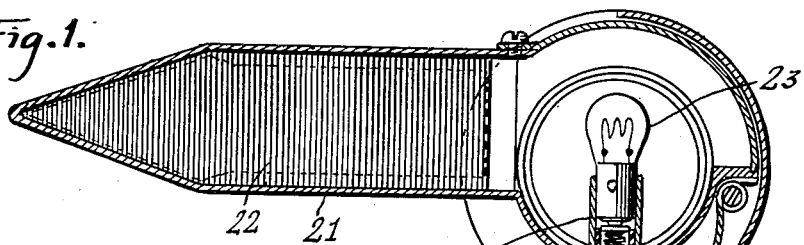
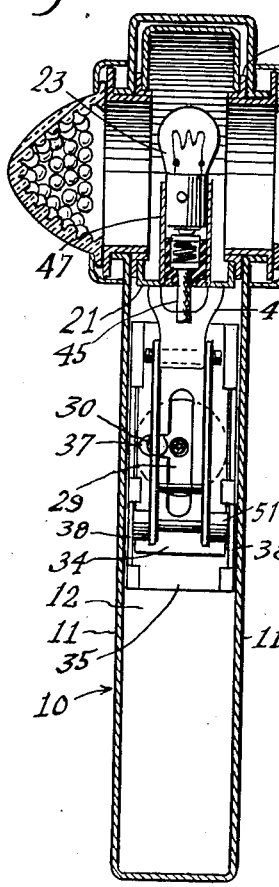
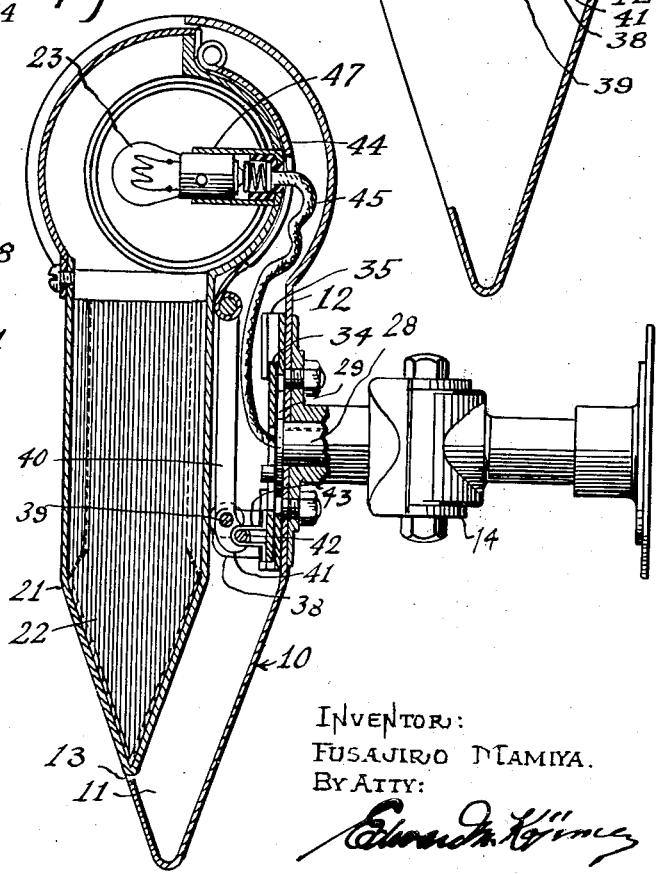
INVENTOR:
FUSAJIRO MAMIYA.
BY ATTY:

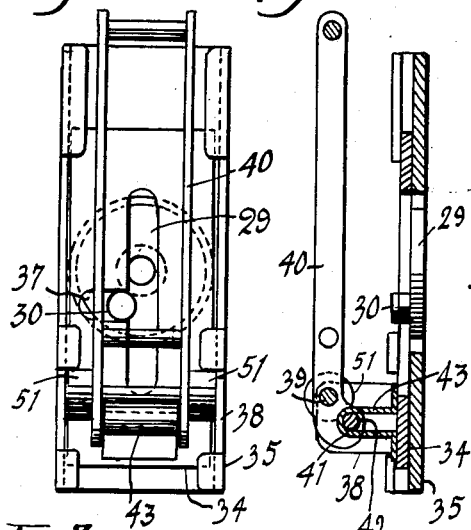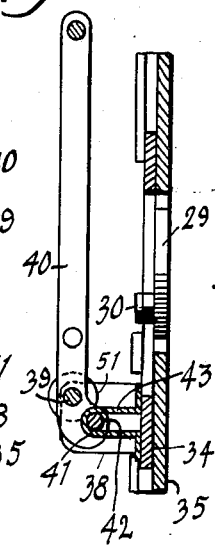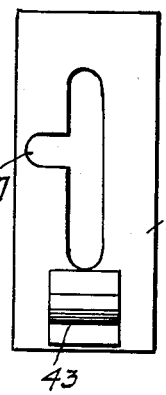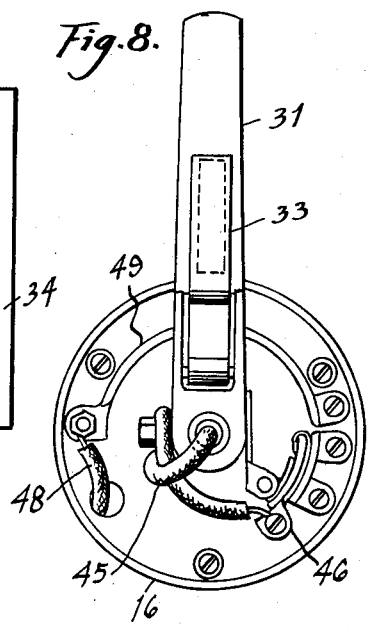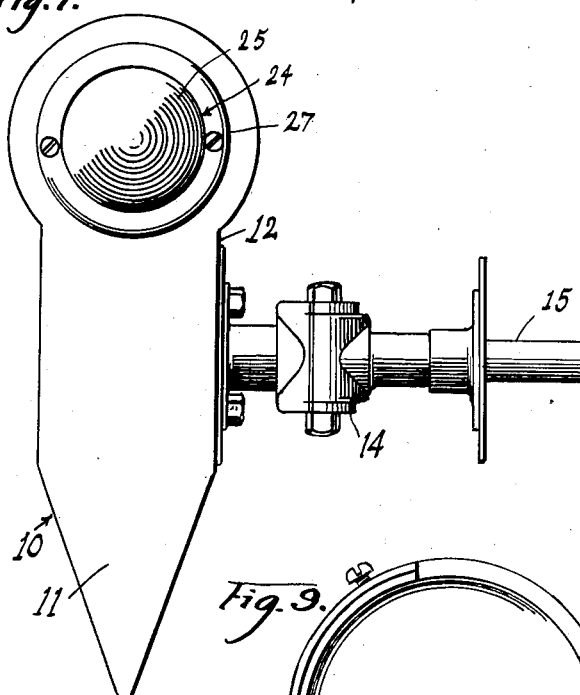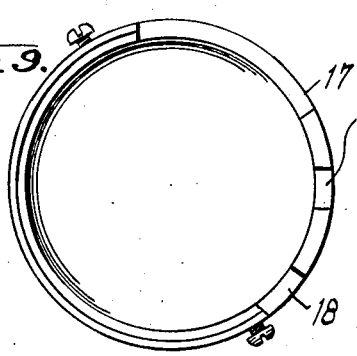

Patented Nov. 20, 1934

1,981,274

UNITED STATES PATENT OFFICE 1,981,274

VEHICLE SIGNAL INDICATOR

Fusajiro Mamiya, Los Angeles, Calif.

Application March 23, 1932, Serial No. 600,681

4 Claims. (Cl. 116—52)

This invention relates to improvements in direction signals for vehicles, and has for its objects to provide a signal device that may be supported from the side of an automobile, and having a semaphore element that may be shifted to a variety of positions for showing changes in direction that the driver wishes to steer the vehicle, or to indicate the intention of the driver to stop.

Other objects of this invention are to simplify the construction of signals of this class, to provide a signal which is easily operated and which will not occupy a great amount of room in the vehicle, and to provide a signal capable of being attached to many existing vehicle constructions without requiring change or alteration therein.

Other objects are to provide a signal which will be ornamental in appearance, well adapted for both day and night use, which will show direction by a semaphore, and to provide a signal which will be compacted to minimum size in inoperative position.

With the foregoing and other objects in view, the invention will be more fully described hereinafter and pointed out in the appended claims.

In the drawings: Figure 1 is a sectional elevation of the signal in signaling position. Fig. 2 is a sectional elevation of the signal in signaling position transversely through the housing. Fig. 3 is a sectional elevation of the signal with the signal elements in non-display position. Fig. 4 is a detail view of the actuating mechanism that is within the housing. Fig. 5 is a sectional elevation of that portion of the mechanism within the housing. Fig. 6 is a detail view of the actuating slide member. Fig. 7 is a front elevation of the complete signal device. Fig. 8 is a detail plan view of the switch and operating handle. Fig. 9 is a detail plan view of the cover for the switch.

The invention as illustrated may be applied to the outside of any conventional automobile and particularly to the sloping and inclined wall adjacent to the windshield, and consists of a housing 10 having front and rear walls 11, a side wall 12, and the outer opening 13 between walls 11. The housing may be secured to the automobile by supporting bracket 14, adapted for attachment to the usual sloping or inclined walls of the automobile. The housing has attached thereto a tubular casing 15, on the inner end of which is mounted a switch casing 16 having a cover 17, provided with notches 18. The housing walls 11 are provided with inwardly projecting bearing members 19. Signal semaphore 21 is operatively mounted on bearing members 19, and has colored glass walls 22, and an electric bulb 23 mounted therein. Other parts of the housing consist of two parabolic lens 24, each of which is mounted in a wall 11, and which has an outer smooth surface 25, and an inner surface having hemispherical projections 26. Lens 24 are each secured by retainer members 27.

To actuate the semaphore 21, I provide a tubular shaft 28 which is operatively mounted in tubular casing 15, and which has on its outer end within the housing 10, a disk 29, provided with a cam 30, and which has on its inner end within the switch casing 16, an actuating lever 31, adapted to move through slot 32 in the switch casing, and having thereon a lever 33, adapted to engage with notches 18, in cover 17.

A slide member 34, mounted in a guide member 35 which is fixed to wall 12, of the signal housing, has a slot 37 in which cam 30 operates. Member 35 has projecting ears 38, carrying a shaft 39. A tiltable member 40 is mounted on shaft 39, and has short arms 41 carrying a fixed shaft 42, which is laterally slidable in a loop member 43, fixed to slide member 34. Rotary movement of the disk 29 actuates cam 30 through arcuate paths of movement, thereby actuating the slide member with corresponding reciprocatory movement, and the tiltable member 40 with a swinging movement. Member 40 is connected by link 44 with the semaphore, thereby actuating the semaphore to display positions in accordance with the placing of lever 33 in the required notch 18. An electric wire lead 45, extends from switch member 46, through rotary shaft 28, and to electric bulb socket 47 within the semaphore. A wire lead 48 is adapted to be connected to a source of electric energy (not shown), and is connected to contact member 49 within the switch housing. In inoperative position, the movable switch member 46 is not in contact with member 49, but will engage therewith in any operative position of the semaphore.

In use, the operator will actuate lever 31, and place lever 33 in any of the desired notches for displaying a signal, and thereby will actuate the semaphore to a corresponding position. Lever 33 is retained in the notches by spring 50. Rubber washers 51 are mounted on shaft 39, and interposed between members 38 and tiltable member 40.

What is claimed is:

1. In a signal indicator, a signal housing, a semaphore operatively mounted therein and adapted to project therefrom in display positions, a tubular casing projecting from the signal housing, a shaft rotatable within the tubular casing, a lever for actuating the shaft, a disk fixed to the outer end of the shaft and disposed within the signal housing, a cam on the disk, a slotted slide member in engagement with the cam, a tiltable member within the signal housing and in engagement with the slidable member, and a link connected to the semaphore and to the tiltable member.

2. In a signal indicator, a signal housing, a semaphore pivotally mounted relative to the signal housing, and operative to angular display positions, a rotary disk within the housing, a cam on the disk, a slide member in engagement with the cam, a tiltable member arranged to be actuated by the slide member, and a link operatively connecting the tiltable member with the semaphore.

3. In a signal indicator, a signal housing, a semaphore pivotally mounted relative to the housing and operative to angular display positions, a rotary disk within the housing, a cam thereon, a slide member in engagement with the cam, a tiltable member in engagement with the slide member, a link operatively connecting the tiltable member and semaphore, a rotatable shaft on which the disk is mounted, a lever for actuating the shaft, and means for limiting the position and movement of the actuating lever.

4. In a signal indicator, a signal housing, a semaphore pivotally mounted relative to the housing and operative to angular display positions, a guide member fixed to the inner wall of the housing, a slide member operative within the guide member, a tiltable member mounted on the guide member and in engagement with the slide member, a link operatively connecting the semaphore with the tiltable member, a rotatable disk within the housing, a cam on the disk in engagement with the slide member, and means for actuating the disk through limited arcs of movement.

FUSAJIRO MAMIYA.